Patented Jan. 16, 1934

1,943,334

UNITED STATES PATENT OFFICE 1,943,334

METHOD OF TREATING METALLURGICAL ORES

Thomas A. Mitchell, Denver, Colo., assignor to Lafayette M. Hughes, Denver, Colo.

No Drawing. Application January 20, 1931, Serial No. 510,063. Renewed January 30, 1933

25 Claims. (Cl. 75—18)

This invention relates to a method of treating metallurgical ores so that values may be readily and efficiently recovered therefrom.

The metallurgical ores containing the valuable metals, such as zinc, lead, copper, silver, gold and manganese, commonly occur in nature as sulfides, sulfates, oxides, silicates and carbonates. These ores may occur in simple forms containing but one of the valuable metals but more often they are complex mixtures of crystals of ore metal compounds, commonly occurring as sulfides, intermingled with one another and with large quantities of undesirable impurities, such as pyrite, and interspersed with the rock gangue of quartz and various silicates. It is this complexity of structure that has made it difficult or expensive to separate the ore values.

It has been standard practice to roast these ores with a flux in such a manner as to form a sinter, and then to smelt the sinter to obtain a desired ore metal. Also, aqueous bath methods have been employed for extracting ore metal compounds from the ore or a roasted product. These processes have proven to have decided limitations in such matters as efficiency, economy and loss of ore metals. For example, it has been difficult to smelt a complex ore containing high amounts of both zinc and lead, and it has not been economical to smelt a low grade zinc ore or feasible to secure all of the zinc in a roasted complex ore, and particularly since the roasted material as heretofore prepared for a leaching process has been a hard, vitreous, indurate mass incapable of ready penetration by the leaching solution.

It is therefore the primary object of my invention to so treat such ores by a preliminary furnacing operation that they may be easily leached by means of solutions or efficiently attacked by gaseous reagents and a high percentage of desired ore metal values recovered therefrom.

A further object is to provide a method of treating metallurgical ores which leaves them in a porous, friable or pulverulent condition and in such physical form that they may be easily leached and then extracting the metal values therefrom directly by solvents, and particularly by leaching solutions which convert the desired ingredients to easily recoverable compounds.

In accordance with my invention, and to accomplish these desired ends, I propose to calcine or roast a metallurgical ore in the presence of a sulfur-bearing material and an alkaline earth metal compound which are capable of reacting to form an alkaline earth metal sulfate interspersed throughout the calcine, and the ingredients are so proportioned that a sufficient quantity of this alkaline earth material is present in intimate relation with the ore so as to insure that the resultant calcine is not hard, indurate, vitreous or sintered, but is a porous, friable, pulverulent material capable of permitting a rapid attack by various liquid or gaseous reagents which will convert the ore metal values to recoverable soluble compounds. In order to increase the porosity of this calcine, I treat the mass with a reagent which will transpose the alkaline earth metal sulfate to another insoluble compound, such as a carbonate, and remove the sulfate radical as a soluble salt, and at the same time serve to open up new pores or to enlarge the channels or passages which have been previously formed. This step may involve the simultaneous leaching of an ore metal value from the calcine.

As a further feature of my invention, I propose to so carry on the furnacing operation as to form a metallate of an ore metal and the alkaline earth metal, as well as to form the alkaline earth metal sulfate, and to so treat the furnaced product as to recover the ore metal from the metallate and to separate it readily from the undesired ore materials.

If the ore contains sulfides of metals which tend to oxidize to either the oxide or the sulfate when roasted in the presence of oxygen, I have discovered that the presence of an alkaline earth metal compound which is reactable with the available sulfate radical that remains in the calcine tends to prevent such ore metal sulfides as those of zinc, copper and silver from being oxidized to the sulfate form. To accomplish this desirable end, I so proportion the alkaline earth metal compound relative to the amount of available sulfate radical, and I so control the furnace conditions that all of the reactable and available sulfate radical which stays in the calcine will unite with the alkaline earth metal by preference and prevent such metals as zinc from going to the sulfate form.

I have further found that if there are sulfates of zinc and other metals present in the ore as obtained in nature, these are transposed to the oxides of the ore metals by an alkaline earth metal oxide or hydroxide in the presence of water. This is due to the tendency for zinc sulfate, for example, to react with the alkaline earth metal hydroxide, such as calcium hydroxide, to form alkaline earth metal sulfate and zinc oxide. This reaction serves to open up the ore particle and make it more readily attackable by subsequent reagents, and particularly because when the wet ore particle, made up of a mixture of ore and alkaline earth material, such as calcium hydroxide and hydrated calcium sulfate, is dried and then calcined, this operation serves to drive off the combined water from the hydroxide and sulfate and to leave open pore spaces and channels.

Of the alkaline earth metal compounds which may be employed in this initial calcination stage I prefer to use the oxides, hydroxides or carbonates of calcium, barium, strontium or magnesium, and I may utilize the materials found in nature containing these metals, such as limestone, dolomite, witherite and strontianite or products obtained by suitable treatment of these natural products.

The sulfur compound employed in the reaction will depend upon the nature of the ore being treated. If sulfur is not present in the ore or is not in sufficient quantity for the purpose, various sulfur compounds may be added to furnish the sulfate radical for combination with the alkaline earth metal. For example I may add a pyritic ore, or iron sulfide, which will form some sulfur trioxide during the roasting, or I may employ sulfuric acid, or metal sulfates such as the sulfates of zinc, aluminum and iron or complex sulfate bearing minerals, such as alunite. I prefer to use the sulfates of metals which are present in the ore or those which will not detrimentally affect the process employed for recovering the ore metal values. If a barium compound is employed in the reaction an insoluble barium sulfate is produced. On the other hand magnesium sulfate is soluble in water and if desired it may be removed from the calcine by leaching with water before the valuable ore ingredients are dissolved from the ore. Strontium sulfate will go largely with the residue.

The temperature as well as the control of the roasting operation will determine the end products. To form a metallate may require a high temperature, ordinarily above 700° C. If it is not desired to form a metallate compound of the alkaline earth metal and an ore metal, then the temperature is kept as low as is consistent with the formation of the alkaline earth metal sulfate and a satisfactory roasting operation. This may sometimes be as low as 300° to 400° C. The lower temperature minimizes the formation of ferrates, silicates, aluminates, etc. from the ore ingredients. For a common sulfide ore containing iron, zinc, lead and copper, this temperature may ordinarily be as low as will serve for the free burning of the sulfur of the ore, but it may run up to a fairly high point, such as 1000° F. or higher, without producing serious complications, since the alkaline earth present in the constantly agitated mass serves in a protective capacity. If the metallates are to be produced, the temperature must be higher, the exact degree of which will depend on the type of ore being treated. If alumina and silica are present, and alkaline earth compounds therewith are to be formed, the temperature may have to be raised as high as 1100° to 1400° C., in which case the alkaline earth metal will combine with all of the reactable ingredients to form sulfates, silicates, aluminates, zincates and the like.

The thermal energy required for the reaction may be obtained wholly or in part from the ore itself if there are material amounts of sulfide present, such as iron pyrites or the sulfides of the valuable ore metals, and the temperature conditions will be maintained and controlled as desired to produce the required end product. If the ore does not contain sufficient sulfur or other combustible material for generating this heat then I may add to the ore another ore sufficiently high in sulfur or other materials which will burn as desired, or the heat may be obtained solely from or supplemented by a gas, oil or other flame introduced into one end of the calcining chamber.

In order that the reactions may be accomplished to the maximum extent the ore, which may be either a raw ore of low or high grade or a highly concentrated one, is ground to a finely divided size and is intimately mixed with the alkaline earth material, such as calcium oxide. They are preferably ground together in the presence of water, so that any reactable ore metal sulfate present will be converted to the oxide form. It is also desirable that the mixture of finely divided ore and alkaline earth material be agitated or stirred continuously during the roasting operation so as to minimize any tendency for the grains to sinter together and to provide a physical barrier which aids in keeping the zinc and iron from uniting.

In order to make sure that the calcine comes from process as a non-sintered and friable or pulverulent material, I preferably so proportion the alkaline earth material and the sulfur bearing content that the alkaline earth metal sulfate formed therefrom will constitute at least 10% of the total mass of the calcine, but this amount may be varied within wide limits, as determined by the nature of the ore being treated and the conditions of the calcining operation. If the ore is a sulfide and metallates are not to be formed, I calculate the amount of the alkaline earth metal compound as the molecular equivalent of those reactable metals which can remain as oxides in the calcine.

If metallates are to be formed, there must be sufficient alkaline earth metal compound for all of the reactable ore materials, as will be determined by analysis. As an example of this process, if the reagent is $CaCO_3$ and if the ore contains the sulfides of various metals, and it is desired to form the metallates of calcium, then calcium carbonate should be used in such an amount that there is sufficient present to unite with all of the valuable metals, such as zinc, so as to form mono-metallates, such as calcium zincate ($CaZnO_2$), and there should be sufficient $CaCO_3$ present to react with all of the alumina, silica and other reactable impurities which are present so as to form alkaline earth metal compounds therewith. In addition to this, there must be enough $CaCO_3$ to react in every case with the ore metal sulfates or sulfuric acid or other available sulfate present or added so as to produce calcium sulfate intermixed throughout the calcine. The formation of this $CaSO_4$ is necessary, and in every case the alkaline earth metal compound, the ore and the sulfate reagent should be so proportioned as to form alkaline earth metal sulfate in sufficient quantity to make the product porous or otherwise ready for the later leaching operation. The various molecular equivalent amounts of the ore and reagents may ordinarily be calculated in accordance with an analysis of the crude ore, it being evident that exact proportions are not required in such crude furnacing operations. It is however desirable that the alkaline earth reagent be present in amount sufficient to keep the final product basic.

The reactable sulfur compound may be obtained from the ore itself if it contains sulfides or sulfates, such as ores containing the sulfides of zinc, lead, copper, silver, iron or the like. The sulfate may be formed during the roasting operation in which the alkaline earth metal is present or the sulfide ore may be preliminarily roasted before the alkaline earth metal is added. For example, the ore may be given a preliminary roasting operation to oxidize a part or all of the sulfide to oxides and sulfates, care being taken to see that a sufficient amount of ore metal sulfate remains to insure that when the ore is re-roasted with the alkaline earth metal compound the sulfate thereof will be found in the final calcined mass in sufficient quantity to make an easily leachable product.

As a result of this preliminary treatment of an ore or a concentrate thereof, it will be found that the calcine contains a sulfate which may be transposed to a soluble compound and so form numerous pores and passages or enlarge those already present through which the ore values may be reached. To this end, the calcine is leached with a suitable reagent, such as caustic soda or sodium carbonate or a proper mixture thereof, which will react with the alkaline earth metal sulfate. For example, sodium carbonate will form a soluble sodium sulfate and calcium carbonate, and the sodium salt will go into solution and leave pores and channels throughout the mass. Soluble compounds may also be formed by reaction of the leaching solution with the calcium metallates. Thereafter the calcine may be treated with reagent solutions or gases which will attack the compounds of the valuable metals readily, and preferably with those which will leave the undesired materials in the residue, when the mass is filtered.

An example of a metallurgical ore which may be treated by this process is the Wellington ore from Breckenridge, Colorado. This ore which contains the sulfides of lead, zinc and iron as well as the silicates of calcium, aluminum and magnesium analyzes as follows:

| | Per cent |
|---|---|
| Silica | 20.6 |
| Iron | 14.6 |
| Aluminum oxide | 3.6 |
| Sulfur | 23.2 |
| Zinc | 18.4 |
| Lead | 5.2 |
| Calcium oxide | 3.3 |
| Magnesium oxide | 1.6 |
| Carbon dioxide | 3.0 |

This Wellington ore may have limestone added thereto in quantity sufficient to form the ore metallates of calcium as well as calcium sulfate and silicate. In this case, the limestone may be added in the proportion of about 168 parts by weight to 100 parts of ore, as calculated from the above analysis.

If desired, the ore may be given a preliminary roasting operation to form the oxides and sulfates before the alkaline earth metal compound is added. In that case, the roasted ore may analyze as follows, and for 100 parts of ore the limestone will be employed in the proportions indicated:

| Ore Analysis | | Limestone |
|---|---|---|
| | | Parts by weight |
| Lead | 3.0 | 1.5 |
| Zinc | 19.3 | 29.7 |
| Iron | 15.6 | 28.3 |
| Silica | 38.0 | 64.0 |
| Sulfur | 6.6 | 20.6 |
| | | 144.1 Total |

As an example of an ore and lime mixture where there are to be no metallates formed, a Gilman, Colorado ore of the following analysis may be selected:

| Total sulfur | Fe | Pb | Cu | Zn | CaO | MgO | SiO$_2$ |
|---|---|---|---|---|---|---|---|
| 33.1 | 30.9 | 0.8 | 0.4 | 15.2 | 1.0 | 0.4 | 2.2 |

Since the chief ore metal of value is zinc, then if lime is selected for the alkaline earth material, it is calculated in amount to be the molecular equivalent of the zinc, in order that there may be sufficient calcium present to combine with all the available sulfate radical which might otherwise go to form zinc sulfate. The iron may be disregarded in this calculation since it will easily go to the oxide form. The molecular weights of the zinc and calcium oxide being in the ratio of 65 to 56, this gives a theoretical amount of 13.09 lbs. of CaO for the 15.2 lbs. of zinc. While the various conditions of the calcination process as well as the particular chemical composition of the ore necessarily determine the exact amount of lime used, I generally prefer to have the lime in excess of the theoretical amount. A satisfactory treatment of the above described ore is obtained by utilizing 83 parts of ore and 17 parts of calcium oxide.

This mixture of the raw or roasted ore and limestone or calcium oxide is preferably ground in a ball mill with water to about that size which will just pass through a screen of 150 meshes to the linear inch. The slurry is then dried and crushed to produce a particle of the size of a pea or smaller. This dried material may then be fed into the upper end of an inclined rotary kiln, which may be heated to a temperature of about 300° C. The lower end of the kiln is heated by suitable means to a temperature of about 800° to 1000° C. or higher, depending on the ultimate product desired, and the atmosphere is maintained in an oxidizing condition. As a result, the zinc sulfide is converted to an oxide and the lead to a sulfate, while the iron is roasted to an oxide, provided the temperature is not high enough for forming metallates. Otherwise, the calcium unites with zinc to form calcium zincate and with other ore materials to form compounds therewith. Calcium sulfate is also interspersed throughout the calcine. The iron may be present as CaFe$_2$O$_4$ and Fe$_2$O$_3$, and some oxides of other metals will also be present, the quantity of which depends upon the completeness of the calcining reactions. If the ore contains silver and copper, these may be present as oxides, if calcined at a high temperature. At a high temperature lead may form a plumbate or fume off.

The subsequent treatment depends on the ingredients present in the ore and what end products are desired. By leaching the ore with sodium carbonate or soda ash, the reagent and the calcium sulfate are transposed to form $CaCO_3$ and $Na_2SO_4$. Ammonium carbonate serves likewise. This sodium or ammonium sulfate dissolves in the bath and so accentuates the porous condition of the mass. If caustic soda is used for the leaching agent, the oxide of zinc will go into solution, whereas calcium and magnesium silicate, for example, will go into the residue. Various solvents known to those skilled in the art may be employed for removing the ore metal values, but it will be appreciated in view of the above explanation that such solvents will have ready access to the metal compounds in the calcine due to the fact that it is not vitreous and hard but is either in a powdered form or easily grindable and porous.

If a barium compound is employed in the roasting operation an insoluble barium sulfate is produced. Hence the use of barium carbonate avoids the formation of soluble sodium sulfate by reaction with the sodium carbonate solution used for leaching, as occurs when the calcium carbonate is used as the alkaline earth metal reagent, and the barium sulfate will be found in the residue. If magnesium carbonate is employed and magnesium sulfate is produced, this may be leached out of the ore with water immediately after calcining and before any further treatment, so as to eliminate the formation of any large amount of sodium sulfate in the mass. Strontium sulfate will be found with the residue.

It is to be understood that the formation of the alkaline earth metal sulfate in the roast has served to produce a mass in which the ore metal compounds, such as zinc oxide, are separated by crystals of the sulfate, such as gypsum, and that this crystalline structure presents a large number of minute crevices, parting planes and pores between the minute crystals, and that these crystals are so intimately mingled that the desired ore metal particles are separated and held in such spaced relation that solutions can readily permeate the mass. Also, the transposition of calcium sulfate to a carbonate serves to open up the ore structure further and to accentuate its permeability to the solutions. If the ore had not been roasted with the alkaline earth material, then it would be present as a sinter or hard particles which do not permit penetration of reagent solutions. On the contrary I grind the ore material to a very fine size initially and mix it intimately with the lime or other alkaline earth material in amount sufficient for fixing the available sulfate radical as calcium sulfate; and by roasting the mixture while agitating the material thoroughly and by otherwise satisfying the conditions herein set forth, I insure that the material remains in a powdered condition or one easily crumbled to a powder, and that the ore particles cannot agglomerate into a vitreous or sintered mass, as has heretofore been the case when the ore has been fluxed with lime preparatory to a smelting operation. It is also to be noted that the sulfate radical combined with the alkaline earth metal, which was derived either from the ore, such as a sulfide, or from a sulfate added for the purpose, has been removed from the ore by transposing the alkaline earth metal sulfate to a carbonate and at the same time forming soluble ammonium or sodium sulfate which goes with the leaching solution.

The subsequent treatment depends on the nature of the roasted and leached material. If for example, calcium zincate has been formed, the ore may be treated with caustic soda to dissolve the zinc. Zinc or copper oxide or calcium zincate or cuprate may be removed by first leaching with water and then treating the residue with ammonium sulfate which reacts with the excess of CaO remaining in the calcine to form $CaSO_4$ and ammonia. The latter causes the zinc to go into solution and by blowing in hot air or boiling the solution, zinc oxide is precipitated and the ammonia released for further use. I may also employ a solution of ammoniacal ammonium carbonate or sulfate which is capable of extracting metals by the formation of soluble complex ammonium salts. I may employ for this purpose that crude product known as gas house liquor. For example, if ammonium carbonate dissolved in ammonium hydroxide is used as the solvent, zinc will go into solution as a complex salt, which is believed to be tetra-amino zinc carbonate, in accordance with the following formula:

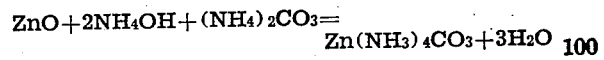
$$ZnO + 2NH_4OH + (NH_4)_2CO_3 = Zn(NH_3)_4CO_3 + 3H_2O$$

If copper is present it will go into solution likewise. If ammonium carbonate is employed, the digesting operation may be conducted under heat conditions which cause copper to separate out as copper carbonate or copper oxide and go with the residue while zinc compounds remain in solution. After filtering, the zinc solution may be heated to drive off ammonia which is used for making the ammonium carbonate reagent and zinc carbonate is precipitated.

It will be apparent in view of the above disclosure that this process applies to various types of metallurgical ores, and in order that the invention may be fully understood various examples involving this process are to be noted. For example, an ore containing a metal sulfide may be calcined at a high temperature with sodium sulfate and calcium carbonate and thereby form calcium sulfate and a sodium metallate. If the ore is a zinc sulfide which has been preliminarily roasted to form some zinc oxide and zinc sulfate, then calcining with calcium carbonate at a temperature of 700° C. or more will produce calcium sulfate and calcium zincate or a mixture of the oxides of calcium and zinc.

If a zinc ore and $CaCO_3$ are calcined with a mineral containing a sulfate, such as alunite, which is a kind of basic alum considered to have the formula $K_2SO_4.Al_2(SO_4)_3.4Al(OH)_3$, then the sulfate portion of the alunite will react with the calcium carbonate in the presence of the ore to form calcium aluminate and calcium sulfate. Potassium zincate and calcium zincate may also be formed.

If a chrome ore other than the sulfide containing silica and other impurities is utilized, this may be mixed with sulfuric acid and calcium carbonate and the calcining carried on at a high temperature to form calcium chromate, calcium sulfate and calcium silicate. Likewise a zinc ore containing zinc oxide and silica may be calcined with calcium carbonate and sulfuric acid or the like to form the calcium sulfate, calcium zincate, calcium silicate and zinc oxide.

It will be apparent that these various reactions, indicated generally in the above statements, will apply to various valuable metals, such as lead, copper, silver, gold, chromium, manganese, vanadium, tungsten and so forth. In each case the sulfate of the alkaline earth metal is to be formed, and one may vary the process by using either calcium or magnesium, barium, strontium compounds. In many cases valuable by-products of these various alkaline earth metals may be obtained. This process may apply to various metallurgical ores which occur as sulfides, such as molybdenite, galena, chalcopyrite, chalcocite, sphalerite and argentite, as well as their concentrates. Also it applies to various oxide ores, such as zincite, cassiterite, rutile, brookite, malachite and scheelite which occur as separate oxides or hydroxides. Likewise, it applies to carbonate ores, such as cerussite and smithsonite, and silicate ores, such as calamine and rhodonite, and sulfate ores such as anglesite. These ores are not found pure but may be mixed with quartz and silicate compounds of magnesium, aluminum, iron, arsenic and antimony, and they often occur with iron compounds.

Although the alkaline earth metal oxides may be used in the calcining operation the carbonate is ordinarily more economical, since at the high temperature employed, it evolves carbon dioxide gas during the action and aids in keeping the calcine in a loose and easily leachable condition. Moreover, this gas may be utilized in subsequent or other operations which deal with treatment of the ore and so make a cyclic process feasible. The operation is one of calcining or roasting and not of smelting. I may utilize the sulfates of various metals, such as the iron and zinc groups, including iron, aluminum, zinc and manganese. It is of course understood that the various reactions which take place in this process are undoubtedly more complex than here indicated, but it is immaterial what compounds are actually formed during calcination and the subsequent intermediate treatment steps, provided the desired results are obtained.

If a magnesium composition is desired for the reagent it may be obtained by using dolomite which comprises the carbonates of both calcium and magnesium. By first leaching the roasted material with water, the magnesium sulfate may be dissolved. Then if it is desired to increase the porosity, the calcium sulfate may be transposed by sodium carbonate to form sodium sulfate and calcium carbonate. If the pores developed by dissolving the magnesium sulfate are large enough, or if there are no other alkaline earth metal sulfates present, then the step of leaching with the carbonate to form soluble sulfate may be omitted, and the step of leaching to recover ore metal values may be undertaken without further preparation of the material.

It will also be understood that the sulfate reagent used for forming the alkaline earth metal sulfate may be the sulfate of any element in the group comprising hydrogen, sodium, potassium, iron, aluminum, zinc, manganese, copper and any other metals of the ore being treated, as well as other elements, the sulfates of which can react in the manner herein set forth. I cannot use for this purpose the sulfate of lead or any other metal which preferentially goes to the sulfate form during the roasting operation and will not give up its sulfate radical to the alkaline earth metal, as will be readily understood.

Having thus described my invention, what I claim as new and desire to secure by Letters Patent is:

1. The method of treating a metallurgical ore comprising the steps of adding thereto a suitable compound of an alkaline earth metal and roasting the mixture in the presence of a reactable sulfur compound, and so proportioning the ingredients prior to the roasting operation that sufficient alkaline earth compound is present to react with substantially all of the reactable sulfate radical present and with the other reactable ingredients of the ore and maintaining such furnacing conditions as to produce a considerable amount of alkaline earth metal sulfate and alkaline earth metal compound with the various reactable ingredients of the ore.

2. The method of treating a metallurgical ore containing a sulfur compound comprising the steps of calcining the ore with a compound of an alkaline earth metal proportioned to react with a considerable proportion of the sulfur compound present in the calcine and to form an alkaline earth metal sulfate interspersed throughout the calcine and subsequently treating the calcine to transpose the alkaline earth metal sulfate to a soluble salt and increase the porosity of the calcine.

3. The method of treating a metallurgical ore comprising the steps of calcining the ore in the presence of a compound of an alkaline earth metal and a sulfur compound capable of reacting to form a sulfate of the alkaline earth metal, carrying on the calcination under temperature conditions which will form a considerable amount of said sulfate interspersed throughout the calcine, and subsequently leaching the mass with a reagent capable of reaction with said sulfate to form a soluble salt and of increasing the porosity of the calcine so that a leaching reagent may readily attack the mass.

4. The method of treating a metallurgical ore comprising the steps of calcining the ore with an alkaline earth metal oxide and a sulfate which are proportioned to form alkaline earth metal sulfate and in the presence of sufficient alkaline earth metal oxide to form an alkaline earth metal compound with a valuable metal in the ore and carrying on the calcination under temperature conditions which will produce the sulfate and the ore metal compound of said alkaline earth metal, and subsequently leaching the calcine with a reagent capable of opening up pores where the sulfate is present, and recovering ore metal compounds.

5. The method of treating a complex metallurgical ore comprising the steps of calcining the ore with a sulfate and an alkaline earth metal carbonate proportioned to form alkaline earth metal sulfate and metallates with the ore metals and other compounds with the reactible impurities and carrying on the calcination at a temperature which will cause the formation of said alkaline earth metal compounds, and subsequently leaching the calcine to convert the sulfate to a soluble material, and dissolving compounds of the calcine.

6. The method of treating an ore containing zinc comprising the steps of calcining the ore in the presence of a sulfate and an alkaline earth metal oxygen compound capable of reacting to form a sulfate of the alkaline earth metal, said compound being added in excess of the amount required to combine with the available sulfate radical and with zinc to form the sulfate and zincate of alkaline earth metal, maintaining a furnace temperature sufficient to produce said zincate and sulfate, and subsequently treating the calcine with a solvent to form a soluble zinc compound.

7. The method of treating an ore containing zinc comprising the steps of calcining the ore in the presence of a sulfate and an alkaline earth metal oxygen compound capable of reacting to form a sulfate of the alkaline earth metal, said compound being added in excess of the amount required to combine with the available sulfate radical and with zinc to form the sulfate and zincate of alkaline earth metal, maintaining a furnace temperature sufficient to produce said zincate and sulfate, and subsequently treating the calcine with an ammoniacal solution of ammonium compound to form a soluble zinc compound.

8. The method of treating a metallurgical sulfide ore comprising the steps of roasting the ore to form a reactable metal sulfate therein, then calcining the roasted material in finely divided condition with a sufficient amount of an alkaline earth metal compound capable of reacting with said sulfate to form a considerable amount of alkaline earth metal sulfate interspersed throughout the calcine and subsequently leaching the mass with a reagent capable of removing the sulfate radical as a soluble salt and of developing porosity in the mass.

9. The method of treating an ore containing zinc sulfide comprising the steps of pre-roasting the ore to form zinc sulfate, calcining it in finely divided condition with a sufficient amount of a calcium oxygen compound capable of reacting therewith to form a considerable amount of calcium sulfate interspersed throughout the mass, and thereafter leaching the mass with a metal carbonate solution capable of forming a soluble sulfate by reaction with the calcium sulfate and thereby developing porosity in the mass.

10. The method of treating a metallurgical ore comprising the steps of providing a finely divided mixture of the ore, an alkaline earth metal compound and a sulfur bearing material capable of producing an alkaline earth metal sulfate during the roasting operation, said compound being of such a nature and present in sufficient quantity to form a considerable amount of said sulfate, wetting the mixture with water, roasting the mixture under furnace conditions capable of forming said alkaline earth metal sulfate and thereafter treating the roast with a reagent which transposes the alkaline earth metal sulfate to a soluble metal sulfate and an insoluble alkaline earth metal compound and thereby increasing the porosity and permeability of the roasted material.

11. The method of treating a metallurgical sulfide ore comprising the steps of mixing it in the presence of water with a calcium oxygen compound capable of forming calcium sulfate and a metallate during the roasting operation, the calcium compound being present in sufficient amount to react with all of the available sulfate radical formed during roasting and with all other reactable ore ingredients, roasting the mixture in a finely divided condition at a high temperature to form calcium sulfate and metallate and other compounds with the ore materials, leaching the roasted material with the carbonate of a metal capable of reacting with the calcium sulfate to form a soluble sulfate and developing a porous mass, and extracting ore metal values by a leaching solution which permeates the developed pores.

12. The method of treating a metallurgical ore comprising the steps of making a finely divided mixture containing the ore, a material capable of providing sulfate radical and an alkaline earth material containing a considerable amount of magnesium oxygen compound capable of reacting with said sulfate radical to form magnesium sulfate, roasting the mixture to form said sulfate interspersed throughout the mass, leaching the roasted material to remove magnesium sulfate and develop porosity and dissolving ore metal values by a liquid reagent permeating the developed pores.

13. The method of treating a metallurgical sulfide ore comprising the steps of roasting the ore with sufficient alkaline earth material containing magnesium oxide to form at least 10% of magnesium sulfate interspersed throughout the mass, subsequently leaching the mass with water to dissolve the magnesium sulfate and develop porosity in the mass and thereafter leaching the porous mass with a solvent for an ore metal value.

14. The method of treating a metallurgical ore comprising the steps of mixing with the ore a metal sulfate and an alkaline earth metal compound capable of reacting with said sulfate to form alkaline earth metal sulfate, roasting the mixture in finely divided condition and forming alkaline earth metal sulfate interspersed throughout the mass and subsequently treating the roasted material with a reagent capable of developing porosity therein.

15. The method of treating a metallurgical ore comprising the steps of roasting a finely divided mixture thereof with a sulfate of the group comprising hydrogen, sodium, potassium, iron, aluminum, zinc, manganese, copper, and the metals of the ore being treated which do not preferentially form a sulfate during the roasting operation, and with an alkaline earth metal oxygen compound capable of reacting with said sulfate to form alkaline earth metal sulfate, said ingredients being proportioned to form a considerable amount of said alkaline earth metal sulfate interspersed throughout the roast, and thereafter treating the roast with a reagent capable of developing porosity in the mass.

16. The method of treating a metallurgical ore containing a compound of a metal capable of forming a metallate with an alkaline earth metal comprising the steps of providing a pulverulent mixture containing the ore, a reactable sulfur compound capable of providing the sulfate radical during the roasting operation and an alkaline earth metal compound capable of and proportioned for forming said metallate with all of said ore metal and an alkaline earth metal sulfate with all of the available sulfate radical, roasting the mixture under oxidizing conditions and at a temperature required to produce said metallate and sulfate of the alkaline earth metal interspersed with the ore material and thereafter dissolving and separating the ore metallate from the roasted ore gangue.

17. The method of treating a complex metallurgical ore comprising the steps of providing an intimate, finely divided mixture containing an ore metal compound and an alkaline earth metal compound capable of forming a metallate, and a metal sulfide capable of providing sulfate radical during the roasting operation, said alkaline earth metal compound being capable of and proportioned for reacting with the available sulfate radical and with the ore metal compound to form alkaline earth metal sulfate and metallate, roasting the mixture under furnacing conditions required to form said alkaline earth metal sulfate and metallate and thereafter removing the sulfate radical as a soluble salt and separating the metallate from the gangue.

18. The method of treating a sulfide ore comprising the steps of intimately mixing therewith an alkaline earth metal oxygen compound capable of and proportioned for reacting with all of the available sulfate radical during the roasting operation to form a sulfate, roasting the mixture under oxidizing conditions, the amount of said alkaline earth material employed and the furnacing conditions being such that the roasted material is pulverulent or friable, non-sintered and porous, leaching the roasted material with a solvent capable of removing as a soluble salt the sulfate radical which has combined with the alkaline earth metal and thus developing porosity in the ore particles, and thereafter recovering ore metal values.

19. The method of treating a sulfide ore comprising the steps of intimately mixing the ore with alkaline earth metal carbonate proportioned to react with the available sulfate radical and form alkaline earth metal sulfate interspersed throughout the ore material, roasting the mixture in an oxidizing atmosphere and maintaining furnacing conditions and a temperature which will serve to decompose the carbonate and cause the evolution of carbon dioxide gas and produce said sulfate and subsequently leaching the ore material with a solvent capable of removing the sulfate radical as a soluble compound and extracting valuable metal compounds from the ore material.

20. The method of treating an ore containing zinc sulfide comprising the steps of mixing the ore with an alkaline earth metal oxygen compound capable of and proportioned for reacting with all of the available sulfate radical to form a sulfate, roasting the mixture to produce zinc oxide and said sulfate and thereafter treating the roasted material with a solution capable of dissolving zinc oxide from the ore and of removing the sulfate radical as a soluble salt and thereby developing porosity in the mass which aids further treatment of the ore.

21. The method of treating an oxidizable ore comprising the steps of providing a finely divided mixture including the ore material, a sulfate of the group comprising hydrogen, sodium, potassium, iron, aluminum, zinc, manganese, copper and the metals of the ore being treated which do not preferentially form a sulfate during the roasting operation, and an alkaline earth metal oxygen compound capable of and proportioned for reacting with said sulfate to form alkaline earth metal sulfate therewith and for forming an alkaline earth metallate with an ore metal, roasting the mixture in a finely divided condition at a high temperature sufficient to form said alkaline earth metal sulfate and metallate, and subsequently treating the roasted material with a solution of an alkali metal compound capable of forming a soluble compound by reaction with said metallate.

22. The method of treating a zinc sulfide ore comprising the steps of providing an intimate mixture of the ore with an alkaline earth metal compound which is capable of and is proportioned in excess of the amount required for combining with all of the zinc to form a zincate and with the available sulfate radical to form a sulfate, roasting the material under oxidizing conditions to produce said sulfate and zincate, and thereafter treating the roasted material with a reagent solution capable of dissolving the zincate and thereby extracting the same and leaving an ore residue in which other values are exposed for subsequent treatment.

23. The method of treating an ore containing zinc and iron sulfides in accordance with claim 22, in which the ore is roasted under oxidizing conditions to form iron oxide and the zincate, after which the roasted material is leached with a solution of an alkali metal compound which dissolves the zincate and leaves the iron oxide in the residue.

24. The method of treating an ore containing zinc sulfide comprising the steps of intimately mixing the ore in granular condition with an alkaline earth metal oxygen compound which is capable of and is proportioned for forming alkaline earth metal zincate with all of the zinc in the ore and alkaline earth metal sulfate with all of the available sulfate radical, roasting the granular mixture, while maintaining furnace conditions to form said zincate, leaching the roasted ore with a solvent for said zincate and recovering a zinc compound therefrom, and thereafter treating the ore residue to recover further ore metal values.

25. The method of treating a complex ore, containing the sulfides of zinc and another valuable metal, in accordance with claim 24, in which the roasted ore material is leached with an aqueous solution containing an alkali metal carbonate which is capable of dissolving the zincate and of transposing the alkaline earth metal sulfate to a carbonate, thereby leaving an ore residue from which soluble zinc compounds have been removed and which contains alkaline earth metal carbonate and residual ore values in condition for further treatment for recovering said values.

THOMAS A. MITCHELL.